United States Patent [19]

Marciandi et al.

[11] 4,442,255

[45] Apr. 10, 1984

[54] SELF-EXTINGUISHING POLYOLEFINIC COMPOSITIONS

[75] Inventors: Franco Marciandi, Rho; Pasquale Relvini, Bollate, both of Italy

[73] Assignee: Montedison S.p.A., Milan, Italy

[21] Appl. No.: 410,704

[22] Filed: Aug. 23, 1982

[30] Foreign Application Priority Data

[IT] Italy .............................. 23645 A/81

[51] Int. Cl.$^3$ .......................... C08K 5/34; C08K 3/32; C08K 5/16; C08K 5/21

[52] U.S. Cl. .................................... 524/414; 524/80; 524/81; 524/100; 524/147; 524/159; 524/428; 524/439; 524/462

[58] Field of Search ................ 524/80, 401, 414, 439, 524/462, 395, 81, 100, 147, 159, 428

[56] References Cited

U.S. PATENT DOCUMENTS 3,931,101  1/1976  Dany et al. .......................... 524/80

*Primary Examiner*—John Kight, III
*Assistant Examiner*—Kriellion Morgan
*Attorney, Agent, or Firm*—Morgan, Finnegan, Pine, Foley & Lee

[57] ABSTRACT

Polymeric compositions possessing an improved resistance to combustion, said compositions consisting of a polyolefin and, for every 100 parts by weight of total composition:

(1) 1–5 parts of red phosphorus;
(2) 0–10 parts of a compound that by thermal decomposition will mainly free ammonia;
(3) 0.3–2 parts of a promoter of free radicals.

3 Claims, No Drawings

SELF-EXTINGUISHING POLYOLEFINIC COMPOSITIONS

BACKGROUND OF THE INVENTION

Methods for improving the anti-ignition properties of olefinic polymers are known in the art.

One of these, described in German Patent Application No. 2,225,323, consists in adding to the polymer up to 30% by weight of the total weight of a combination of red phosphorus and melamine. According to such a method appreciable results are achieved only by adding considerable quantities of the two compounds, more particularly greater than 5% by weight as far as the red phosphorus is concerned.

THE PRESENT INVENTION

It has now been found by the Applicant that it is possible to obtain olefinic polymer compositions endowed with an improved combustion resistance by means of a low addition of anti-flame agents, by using a complex anti-ignition compound consisting of, in the weight percentages of the polymeric composition hereunder indicated, the following substances:
(1) from 1 to 5% by weight of red phosphorus,
(2) from 0 to 10% by weight of a substance capable of freeing mainly ammonia by thermal decomposition,
(3) from 0.3 to 2% b.w. of a promoter of free radicals.

An object of this invention is to provide olefinic polymers having the improved combustion resistance mentioned earlier. It has been found that such an object may be realized by employing the above-mentioned components in the ranges indicated.

As substances capable of freeing ammonia by thermal decomposition, are suited all those compounds, both organic as well as inorganic, that are capable of decomposing at a temperature not lower than the processing temperature of the olefinic polymer, both during the preparation of the compositions as well as in the preparation of possible manufactured articles starting from such compositions (e.g.: extrusion, die-casting, etc.). At any rate, those compounds must have a thermal stability sufficient for overcoming, without decomposition, or only partially decomposing themselves, during the various stages of heat treatment or transformation under heat of the polymer itself.

Examples of usable compounds are, for instance, organic and inorganic ammonium salts such as those containing chloride, phosphates, and ammonium sulphonates, as well as the amino-triazines (melamine, acetoguanamine, benzoguanamine, ammeline, ammelide) and other organic nitrogenous compounds such as urea and its derivatives, thiourea and its derivatives, dicyandiamide. Amongst these compounds preferred ones are the ammonium polyphosphates which fall under the general formula $(NH_4)_{n+2}P_nO_{3n+1}$ wherein n is an integer equal to at least 2.

The composition of polyphosphates of the above general formula, but where n is a number greater than 20, is practically the composition that corresponds to the formula of the metaphosphates $(NH_4PO_3)_n$.

Example of such polyphosphates are: "Exolit 263" (produced and marketed by Benckiser Knapsack G.m.b.H., Germany) having the composition $(NH_4PO_3)_n$ wherein n is greater than 50, and "Phos-Chek P/30" (produced and sold by Monsanto Chemical Co.) of an analogous composition.

Other usable phosphates are those derived from amines such as for instance dimethylammonium sulphate or diethylammonium sulphate, ethylendiamine phosphate, ortho- or pyrophosphate of melamine.

Amongst the free radical promoting compounds there may be considered all those which have a thermal stability sufficient for overcoming, without decomposition, or only partially decompositing themselves, the transformation operations under heat of the polymer, so that in the endproduct or in the manufactured article, said compounds are present in quantities comprising between 0.3% and 2% b.w. Example of usable promoters are for instance: 3,4-dimethyl-3,4-diphenylhexane and 2,3-dimethyl-2,3-diphenylbutane, (marketed as INTEROX CC DFH and INTEROX CC DFB by Peroxid-Chemie GmbH).

Preferred compositions consist of 1%-2% of red phosphorus, from 1% to 5% of the ammonia supplying compound and from 0.3% to 1% of free radical promoter.

When the ammonia supplying compound is however absent, the preferred compositions will consist of from 3% to 5% of red phosphorus and from 0.5% to 1% of free radical promoter.

The compositions of the present invention offer the double advantage of a low level of concentration of total additives, although still falling within classification $V_2$, as far as self-extinguishing properties are concerned, and a low content in red phosphorus, which is notoriously noxious in as far as it may give place, in the presence of humidity, to poisonous phosphorated hydrogen.

The olefinic polymers of the compositions of the present invention, are in particular: polyethylene, polypropylene prevailingly consisting of isotactic macromolecules, the static or block-copolymers of ethylene-propylene.

The self-extinguishing compositions according to the present invention may be obtained according to methods of the Prior Art: for instance, the polymer and the anti-flame additives are mixed together in a Banbury-type or Brabender-type mixer, at the plastification temperature of the polymer. The thus obtained mix is then extruded through a DOLCI-type extruder (screw diameter=20 mm; length/diam. ratio of screw=23; revolving speed of screw=20 rpm) at the temperature most suited for obtaining a granulated product, said temperature varying from polymer to polymer.

For determining the self-extinguishing properties of the polymeric compositions object of the present invention, in general one operates in the following way: With the granulated product, by means of die-casting, there are prepared sheets 1.6 mm thick. On the sheets thus prepared, the level of "self-extinction" is determined by application of UL-94 Standards (issued by "Underwriters Laboratories"-USA) which supply an evaluation of the degree of "self-extinction" of the plastic materials.

The UL-94 Standards Foresee various different more or less strict conditions, and allow classification of the specimen at various levels of "self-extinction".

In the tests reported on Table I, there has been adopted the method of the "Vertical Burning Test" which allows the classification of the test material at decreasing levels: V-0, V-1 and V-2.

The test-piece or specimen, held in a vertical position by a suitable support, is primed or ignited with a flame at its lower end, making two attempts of ignition, each for a duration of 10 seconds. The three "self-extinction" levels indicated above may be thus briefly defined:

V-0 None of the specimen burns for more than 10 seconds after each application of the flame, nor drops burning particles. Moreover, the total combustion time does not exceed 50 seconds for the 10 attempts carried out on the group of 5 testpieces.

V-1 Here are admitted combustion times up to 20 seconds per single testpiece and up to 250 seconds for 10 attempts carried out on a group of 5 testpieces. Also at this level no testpieces should drop burning particles.

V-2 The admitted combustion times are the same as those of level V-1, but there is admitted the dropping of burning particles.

The examples reported by Table I, which are just illustrative and in no way limiting of the inventive idea of the invention, show the percentages and the type of additives in polypropylene-based compositions with a melt index 3.5–5 g/10 min., and moreover indicate the classification of the compositions according to the previously mentioned standards for testpieces 1.6 mm thick, and the combustion time totaled in the 10 ignitions foreseen for each group of 5 testpieces.

For evaluating the values of such a duration, as reported on the Table I, it must be taken into consideration that, according to UL-94 Standards, a classification of the materials under tests V-2 requires a combustion duration not exceeding 250 seconds.

TABLE I

| ADDITIVES | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Red phosphorus[∞] (in % b.w.) | 10 | 5 | 5 | 3 | 5 | 3 | 3 | 2 | 1 | 2 | 2 | 2 | 2 | 2 | 2 |
| Ammonium polyphosphate (in % b.w.) (n > 20) | — | — | 5 | 3 | — | — | 3 | 2 | 6 | 2 | 2 | 2 | — | — | — |
| Interox CC DFH (in % b.w.) | — | — | — | — | 1 | 1 | 1 | 1 | 1 | 0.5 | — | 0.3 | 0.5 | 0.5 | 1 |
| Interox CC DFB (in % b.w.) | — | — | — | — | — | — | — | — | — | — | 0.5 | — | — | — | — |
| Ammonium acetondisulphonate (in % b.w.) | — | — | — | — | — | — | — | — | — | — | — | — | .2 | — | — |
| Ammonium chloride (in % b.w.) | — | — | — | — | — | — | — | — | — | — | — | — | — | 2 | — |
| Melamine (in % b.w.) | — | — | — | — | — | — | — | — | — | — | — | — | — | — | 4 |
| Classification | V₂ | B[o] | V₂ | B[o] | V₂ | V₂ | V₂ | V₂ | V₂ | V₂ | V₂ | V₂ | V₂ | V₂ | V₂ |
| Duration of combustion (seconds) before self-extinction | 12 | — | 22 | — | 10 | 106 | 11 | 21 | 57 | 17 | 15 | 48 | 35 | 22 | 43 |

B[o] stand for: "burns completely without extinguishing itself"
[∞]As red phosphorus there was used "Exolit VPK n 361" in examples from 1 to 14, and "Exolit LPKN 275" in example 15. (Exolit is the trademark of the product by Benckiser & Knapsack (GmbH).

What I claim is:
1. Self-extinguishing polymeric compositions consisting of an olefinic polymer and, on the total weight of the composition, from 1 to 5% of red phosphorus, from 0% to 10% of a substance capable of mainly freeing ammonia by thermal decomposition, and from 0.3% to 2% of a promoter of free radicals selected from the group consisting of 3,4-dimethyl-3,4-diphenylhexane and 2,3-dimethyl-2,3-diphenylbutane.
2. Compositions according to claim 1, characterized in that it consists of from 1 to 3% of red phosphorus, of from 1% to 5% of a substance capable of freeing mainly ammonia by thermal decomposition, and of from 0.3% to 1% of a promoter of free radicals.
3. Compositions according to claim 1, characterized in that they consist of from 3% to 5% of red phosphorus and of from 0.5% to 1% of a promoter of free radicals.

* * * * *

UNITED STATES PATENT AND TRADEMARK OFFICE
CERTIFICATE OF CORRECTION

PATENT NO. : 4,442,255
DATED : April 10, 1984
INVENTOR(S) : Marciandi et al

It is certified that error appears in the above-identified patent and that said Letters Patent is hereby corrected as shown below:

Column 2, line 8, "decompositing" should be --decomposing--.

Column 3, line 23, "20" should be --30--.

Signed and Sealed this

Thirtieth Day of October 1984

[SEAL]

Attest:

GERALD J. MOSSINGHOFF

Attesting Officer     Commissioner of Patents and Trademarks